(12) United States Patent
Dande et al.

(10) Patent No.: US 11,797,486 B2
(45) Date of Patent: Oct. 24, 2023

(54) FILE DE-DUPLICATION FOR A DISTRIBUTED DATABASE

(71) Applicant: Bank of America Corporation, Charlotte, NC (US)

(72) Inventors: Pratap Dande, Saint Johns, FL (US); Gilberto R. Dos Santos, Jacksonville, FL (US); Jayabalaji Murugan, Chennai (IN); Murali M. Atyam, Charlotte, NC (US); Manoj Bohra, Monroe Township, NJ (US)

(73) Assignee: Bank of America Corporation, Charlotte, NC (US)

( * ) Notice: Subject to any disclaimer, the term of this patent is extended or adjusted under 35 U.S.C. 154(b) by 171 days.

(21) Appl. No.: 17/646,849

(22) Filed: Jan. 3, 2022

(65) Prior Publication Data
US 2023/0214359 A1 Jul. 6, 2023

(51) Int. Cl.
*G06F 16/174* (2019.01)
*G06F 16/16* (2019.01)
*G06F 16/14* (2019.01)

(52) U.S. Cl.
CPC ........ *G06F 16/1748* (2019.01); *G06F 16/152* (2019.01); *G06F 16/162* (2019.01)

(58) Field of Classification Search
CPC .. G06F 16/1748; G06F 16/152; G06F 16/162; G06F 16/215; G06F 16/27
See application file for complete search history.

(56) References Cited

U.S. PATENT DOCUMENTS

| | | | |
|---|---|---|---|
| 5,745,900 | A | 4/1998 | Burrows |
| 5,778,395 | A | 7/1998 | Whiting et al. |
| 6,119,124 | A | 9/2000 | Broder et al. |
| 6,240,409 | B1 | 5/2001 | Aiken |
| 6,263,348 | B1 | 7/2001 | Kathrow et al. |
| 6,505,160 | B1 | 1/2003 | Levy et al. |
| 6,658,423 | B1 | 12/2003 | Pugh et al. |
| 7,555,620 | B1 | 6/2009 | Manley |
| 7,624,274 | B1 | 11/2009 | Alspector et al. |
| 7,707,157 | B1 | 4/2010 | Shen |
| 7,725,475 | B1 | 5/2010 | Alspector et al. |
| 7,725,508 | B2 | 5/2010 | Lawarence et al. |
| 8,161,053 | B1 | 4/2012 | Khan et al. |
| 8,346,792 | B1 | 1/2013 | Baker et al. |
| 8,380,718 | B2 | 2/2013 | Gallivan et al. |

(Continued)

FOREIGN PATENT DOCUMENTS

| | | |
|---|---|---|
| WO | 2006008733 A3 | 3/2007 |
| WO | 2008009991 A1 | 1/2008 |

*Primary Examiner* — Angelica Ruiz

(57) ABSTRACT

A device configured to identify a file in a network device, to generate a first set of block hash codes for data blocks for a first instance of the file, and to generate a second set of block hash codes for data blocks for a second instance of the file. The device is further configured to determine the first set of block hash codes matches the second set of block hash codes and to generate an entry in a file list for the instances of the file. The device is further configured to count the number of entries that are associated with the file and to determine the number of entries is greater than the redundancy threshold value. The device is further configured to delete one or more instances of the file in response to determining that the number of entries is greater than the redundancy threshold value.

20 Claims, 3 Drawing Sheets

(56) References Cited

U.S. PATENT DOCUMENTS

| | | |
|---|---|---|
| 8,527,516 B1 | 9/2013 | Spasojevic et al. |
| 8,849,767 B1 | 9/2014 | Zheng et al. |
| 11,494,115 B2 * | 11/2022 | Li .................. G06F 3/0619 |
| 2002/0120682 A1 | 8/2002 | Funaki |
| 2002/0122543 A1 | 9/2002 | Rowen |
| 2002/0123912 A1 | 9/2002 | Subramanian et al. |
| 2002/0143737 A1 | 10/2002 | Seki et al. |
| 2002/0171860 A1 | 11/2002 | Parry et al. |
| 2002/0172425 A1 | 11/2002 | Venkatesan et al. |
| 2003/0106017 A1 | 6/2003 | Kanchirayappa et al. |
| 2003/0140307 A1 | 7/2003 | Bar-Yossef et al. |
| 2005/0022004 A1 | 1/2005 | Mihcak et al. |
| 2005/0055359 A1 | 3/2005 | Kawai et al. |
| 2007/0043757 A1 | 2/2007 | Benton et al. |
| 2007/0078846 A1 | 4/2007 | Gulli et al. |
| 2008/0044016 A1 | 2/2008 | Henzinger |
| 2008/0059512 A1 | 3/2008 | Roitblat et al. |
| 2008/0065630 A1 | 3/2008 | Luo et al. |
| 2008/0222063 A1 | 9/2008 | Krishnaprasad et al. |
| 2008/0243837 A1 | 10/2008 | Davis et al. |
| 2008/0243842 A1 | 10/2008 | Liang et al. |
| 2008/0301198 A1 | 12/2008 | Watanabe et al. |
| 2008/0319995 A1 | 12/2008 | Alspector et al. |
| 2009/0049062 A1 | 2/2009 | Chitrapura et al. |
| 2009/0259650 A1 | 10/2009 | Schuil |
| 2009/0276467 A1 | 11/2009 | Scholtes et al. |
| 2010/0125553 A1 | 5/2010 | Huang et al. |
| 2010/0306412 A1 | 12/2010 | Therrien et al. |
| 2010/0312800 A1 | 12/2010 | Lumb |
| 2010/0313036 A1 | 12/2010 | Lumb |
| 2010/0313040 A1 | 12/2010 | Lumb |
| 2011/0029491 A1 | 2/2011 | Joshi et al. |
| 2012/0246125 A1 | 9/2012 | Kato |
| 2015/0161267 A1 | 6/2015 | Sugawara et al. |
| 2015/0178308 A1 * | 6/2015 | Saliba .................. G06F 11/1453 707/692 |
| 2017/0077950 A1 * | 3/2017 | Pavlov .................. G06F 16/1827 |

* cited by examiner

FILE DE-DUPLICATION FOR A DISTRIBUTED DATABASE

TECHNICAL FIELD

The present disclosure relates generally to databases, and more specifically to file de-duplication for a distributed database.

BACKGROUND

In a computer network, files are routinely being accessed and copied by different users. Over time, the available memory resources (e.g. available disk space) for the computer network are gradually consumed and reduced. Eventually, the network device's memory resource may become so low that network devices are no longer able to store new data from other network devices. In existing systems, data transmissions begin to fail when the receiving network device has an insufficient amount of memory resources available. As data transfer begins to fail, a bottleneck is formed as other network devices continue to try to send data to the network device that is low on memory resources. This bottleneck reduces the flow of data through a communication system which degrades the throughput and performance of the system and may cause the system to come to a halt.

SUMMARY

The disclosed system provides several practical applications and technical advantages that overcome the previously discussed technical problems. For example, the disclosed system provides a practical application by identifying duplicate instances of a file stored within an information system and removing any duplicate instances of the file that exceed an approved number of duplicate instances for the file that can be stored in the information system. The information system is configured to allow an approved number of duplicate instances of a file to be stored in the information system to ensure that multiple copies of the file are readily available for its users. This provides a technical advantage by ensuring that more than one user can have access to a copy of a file at any given time. Over time, as users generate additional copies of a file these copies can result in an excessive number of duplicate instances of the file being stored in the information system. The increase in the number of copies of a file increases the amount of memory resources that are being used and reduces the amount of memory resources that are available for other files and tasks. This problem begins to compound when an excessive number of duplicate instances are generated for multiple files. The disclosed system provides a technical improvement by ensuring that multiple copies of a file are readily available for multiple users while preventing an excessing number of copies of the file from being stored in the information system. By controlling the number of copies of files that are stored in the information system, the disclosed process allows the information system to provide improved memory resource utilization which improves the performance and throughput of the information system. These technical improvements in turn improve the operation of the information system overall.

In one embodiment, the information system comprises a device that is configured to identify files in one or more network devices. Examples of files include, but are not limited to, text files, tables, charts, presentations, images, files, documents, or any other suitable type of digital data. The device is further configured to generate a first set of block hash codes for data blocks for a first instance of a file and to generate a second set of block hash codes for data blocks for a second instance of the file. The device is further configured to determine whether the first set of block hash codes matches the second set of block hash codes and to generate an entry in a file list for the instances of the file in response to determining the block hash codes match. The device is further configured to count the number of entries that are associated with the file and to determine whether the number of entries is greater than the redundancy threshold value. The device is further configured to delete one or more instances of the file in response to determining that the number of entries is greater than the redundancy threshold value.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Information System Overview

Figure 1:
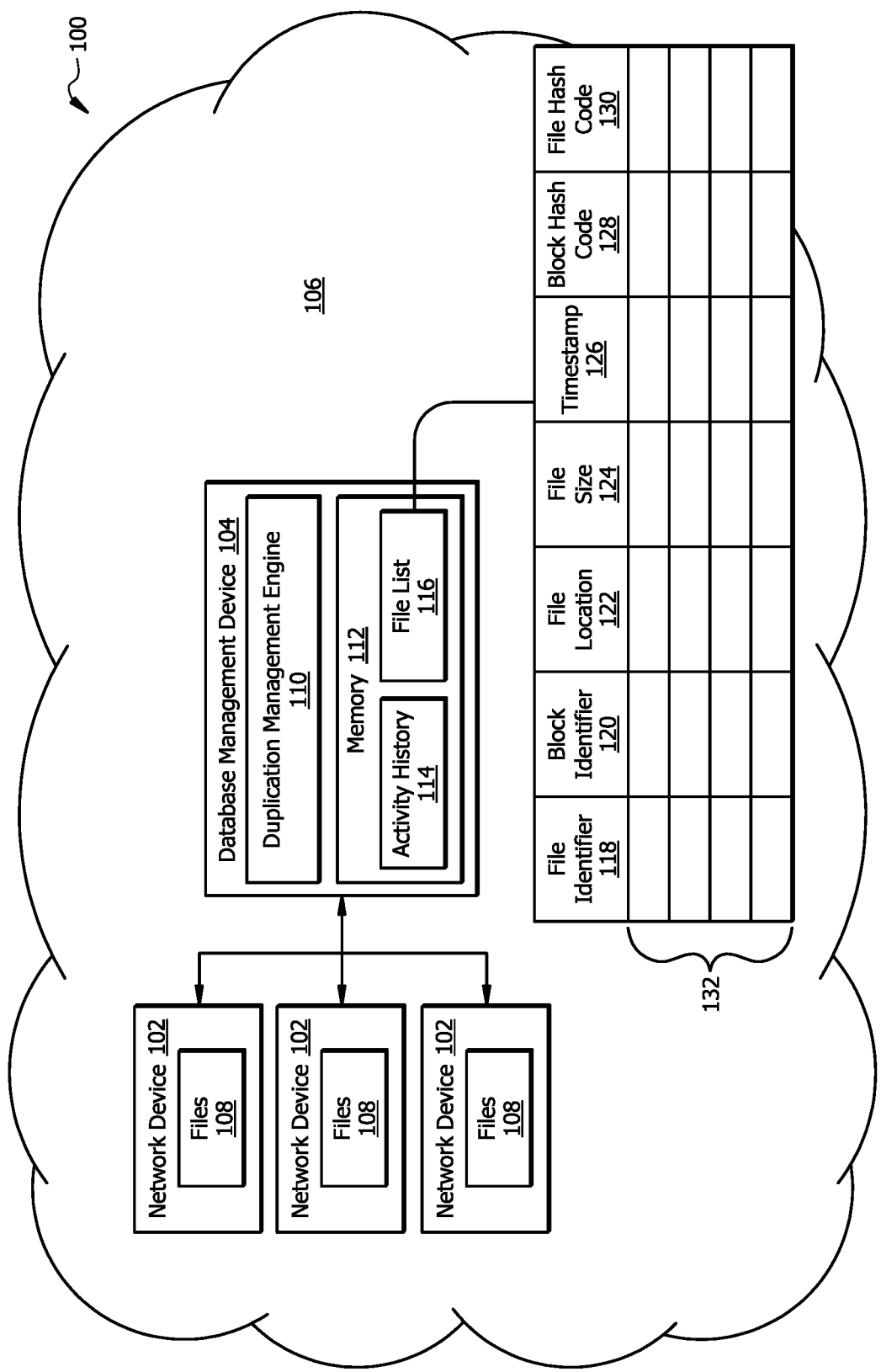
FIG. 1 is a schematic diagram for an information system configured with a database management device.

FIG. 1 is a schematic diagram of an embodiment of an information system 100 that is generally configured to identify duplicate instances of a file 108 stored within the information system 100 and to remove any duplicate instances of the file 108 that exceed an approved number of instances for the file 108 that can be stored in the information system 100. For example, the information system 100 may comprise multiple network devices 102 (e.g. servers, computers, and/or databases) that are configured to store information and files 108 for its users. The information system 100 is configured to allow an approved number of duplicate instances of a file 108 to be stored in the information system 100 to ensure that multiple copies of the file are readily available for its users. This means that more than one user can have access to a copy of a file 108 at any given time. Over time, the users may generate additional copies of a file 108 which can result in an excessive number of duplicate instances of the file 108 being stored in the information system 100. The excessive number of duplicate instances of a file 108 increases the amount of memory resources that are being used. This increase in memory resource utilization reduces the amount of memory resources that are available for other files 108 and tasks. This problem becomes exacerbated when an excessive number of duplicate instances are generated for multiple files 108. To alleviate this issue, the information system 100 is configured to ensure that multiple copies of a file 108 are readily available for multiple users while preventing an excessing number of copies of the file 108 from being stored in the information system 100.

In one embodiment, the information system 100 comprises a plurality of network devices 102 and a database management device 104 that are in signal communication with each other within a network 106. Network 106 allows communication between and amongst the various components of the information system 100. This disclosure contemplates network 106 being any suitable network operable to facilitate communication between the components of the information system 100. Network 106 may include any interconnecting system capable of transmitting audio, video, signals, data, messages, or any combination of the preceding. Network 106 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Network Devices

A network device 102 is a hardware device that is generally configured to provide hardware and software resources to a user. Examples of a network device 102 include, but are not limited to, a server, a database, a computer, a laptop, a smartphone, a tablet, a smart device, or any other suitable type of device. Each network device 102 comprises a memory that is configured to store files 108 for one or more users. Examples of files 108 include, but are not limited to, text files, tables, charts, presentations, images, files, documents, or any other suitable type of digital data. For example, each network device 102 may comprise a directory of folders that each comprise one or more subfolders and/or one or more files 108. In some embodiments, the network devices 102 are configured to work cooperatively with each other to form a distributed database or a data lake for the information system 100.

Database Management Device

Examples of a database management device 104 include, but are not limited to, a server, an access point, a computer, or any other suitable type of network device. In one embodiment, a database management device 104 comprises a duplication management engine 110 and a memory 112. Additional details about the hardware configuration of the database management device 104 are described in FIG. 3. The memory 112 is configured to store activity history 114, file lists 116, and/or any other suitable type of data.

In one embodiment, the duplication management engine 110 is generally configured to monitor the files 108 within the network devices 102, to identify duplicate instances of files 108, and to remove any duplicate instances of a file 108 that exceed an approved number of duplicate instances for the file 108. This process allows the database management device 104 to ensure that multiple instances of a file 108 are available to maintain a level of accessibility for the file 108 for users while also removing excessive instances of the file 108 that would otherwise consume memory resources for the information system 100. This process controls the number of instances of a file 108 that are available within the information system 100 to improve the resource utilization (e.g. memory utilization) of the information system 100. An example of the duplication management engine 110 performing this operation is described in more detail in FIG. 2.

The activity history 114 generally comprises information associated with the activities and operations performed by the database management device 104. For example, the activity history 114 may comprise a record of any duplicate instances of a file 108 that were detected and removed. As another example, the activity history 114 may comprise statistics about the performance of the information system 100. In this example, the activity history 114 may comprise records about processor utilization, network utilization, memory utilization, or any other performance metrics for the network devices 102 of the information system 100. In other examples, the activity history 114 may comprise any other suitable type of information associated with the files 108 and/or network devices 102 of the information system 100.

The file list 116 generally comprises information about the files 108 stored in one or more network devices 102 of the information system 100. In one embodiment, the file list 116 comprises file identifiers 118, block identifiers 120, file locations 122, file sizes 124, timestamps 126, block hash codes 128, and file hash codes 130. The file identifiers 118 comprise identifiers that uniquely identify files 108 or instances of a file 108. Examples of file identifiers 118 include, but are not limited to, file names, alphanumeric labels, or any other suitable type of identifiers. The block identifiers 120 comprise identifiers that identify blocks of data for a file 108. Each file 108 may be partitioned into one or more data blocks. Each data block is associated with a block identifier 120 that uniquely identifies a block of data for a file 108. An example of block identifiers 120 includes, but is not limited to, an alphanumeric label. Each file location 122 identifies a location where a file 108, an instance of a file 108, or a data block for a file 108 is stored. For example, a file location 122 may identify a network device 102 (e.g. a Media Access Control (MAC) address or an Internet Protocol (IP) address) and/or a file path within a network device 102. The file sizes 124 identify the size of an instance of a file 108 or a data block for a file 108. The timestamps 126 identify a time when an instance of a file 108 was created or modified. Each block hash code 128 is the result of performing a hashing operation on the data content of a data block for a file 108. Each file hash code 130 is the result of performing a hashing operation on the data content of an instance of a file 108. For example, the database management device 104 may generate a file hash code 130 by merging multiple data blocks for a file 108 to generate a complete version of the file 108. The database management device 104 may then perform a hashing operation on the completed version of the file 108. The result of the hashing operation is a file hash code 130 that is uniquely associated with the data contents of the complete file 108. In other examples, the file list 116 may comprise any other suitable type or combination of information associated with a file 108.

File Removing Process

Figure 2:
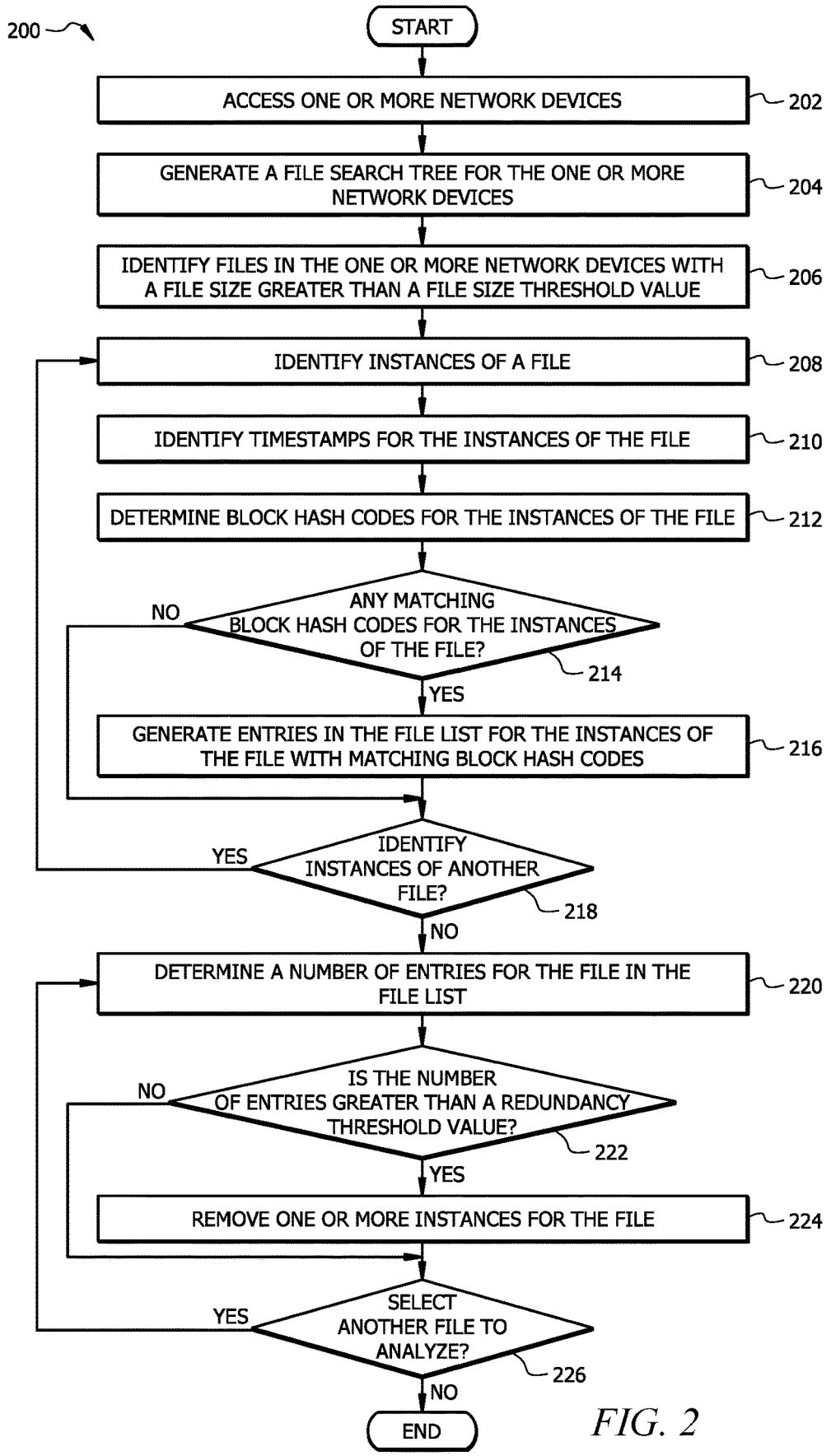
FIG. 2 is a flowchart of an embodiment of a file removing process for the information system.

FIG. 2 is a flowchart of an embodiment of a file removing process 200 for the information system 100. The information system 100 may employ process 200 to identify duplicate instances of a file 108 stored within the information system 100 and to remove any duplicate instances of the file 108 that exceed an approved number of duplicate instances for the file 108 that can be stored in the information system 100. This process ensures that multiple copies of a file 108 are readily available for multiple users while preventing an excessing number of copies of the file 108 from being stored which would occupy additional memory resources of the information system 100 and reduce the amount of memory resources that are available for other files 108 and tasks.

At operation 202, the database management device 104 accesses one or more network devices 102. Here, the database management device 104 establishes a network connection with one or more network devices 102. The database management device 104 may use any suitable communication protocol for establishing a network connection with a network device 102. After the database management device 104 establishes a network connection with a network device 102, the database management device 104 is then able to access and view the files 108 that are stored within the memory of the network device 102.

The database management device 104 may establish a persistent network connection or a temporary network connection with a network device 102. When the database management device 104 establishes a persistent network connection, the database management device 104 will remain connected to the network device 102 until the network connection is broken by the network device 102 or the database management device 104. When the database management device 104 establishes a temporary network connection, the database management device 104 may connect to the network device 102 for a predetermined amount of time. After the predetermined amount of time elapses, the database management device 104 will disconnect from the network device 102. In some embodiments, the database management device 104 is configured to periodically re-establish a network connection with a network device 102. For example, after the database management device 104 breaks its connection with a network device 102, the database management device 104 may wait a predetermined amount of time before automatically reestablishing a network connection with the network device 102. This configuration allows the database management device 104 to efficiently connect with the network devices 102 to access their files 108 without overconsuming network bandwidth for the information system 100.

At operation 204, the database management device 104 generates a file search tree for one or more network devices 102. The file search tree is a data structure that identifies relationships between folders and sub-folders in the memory of a network device 102. The file search tree allows the database management device 104 to efficiently search for files 108 stored within a network device 102. In one embodiment, the database management device 104 generates a file search tree by accessing and identifying one or more folders and their nested sub-folders within a memory of a network device 102. After generating the file search tree, the database management device 104 may traverse the folders within the file search tree to identify the files 108 that are stored within each network device 102. In other embodiments, the database management device 104 may use any other suitable type of data structure or technique for identifying the files 108 within a network device 102.

At operation 206, the database management device 104 identifies files 108 in the one or more network devices 102 with a file size 124 greater than a file size threshold value. The file size threshold value is a user-defined value that may be set to any suitable value. For example, the file size threshold value may be set to 64 kilobytes or any other suitable value. In one embodiment, the database management device 104 first identifies a file 108 and then determines the file size 124 for the file 108. The database management device 104 then compares the determined file size 124 to the file size threshold value to determine whether the file 108 has a file size 124 that is greater than the file size threshold value. In some embodiments, the database management device 104 may perform a similar process at the data block level for a file 108. For example, the database management device 104 first identifies data blocks for a file 108 and then determines file sizes 124 for each of the data blocks. The database management device 104 then compares the determined file sizes 124 to the file size threshold value to determine whether data blocks for the file 108 have a file size 124 is are greater than the file size threshold value. Through this process, the database management device 104 generates a list of files 108 within the one or more network devices 102 that have file sizes 124 greater than the file size threshold value. In some embodiments, the database management device 104 may omit operation 206. In this case, the database management device 104 will generate a list that identifies all of the files 108 that are present within the one or more network devices 102.

At operation 208, the database management device 104 identifies instances of a file 108. After generating a list of the files 108 that are stored in the one or more network devices 102, the database management device 104 begins identifying multiple instances of each file 108. In one embodiment, the database management device 104 uses file identifiers 118 (e.g. file names) to initially identify multiple instances of a file 108.

At operation 210, the database management device 104 identifies timestamps 126 for the instances of the file 108. In some embodiments, the database management device 104 may also use timestamps 126 to identify multiple instances of a file 108. For example, when multiple instances of a file 108 are generated, the instances of the file 108 will all share the same timestamp 126 value that indicates when they were created. The database management device 104 uses this characteristic to identify multiple instances of the same file 108.

At operation 212, the database management device 104 determines block hash codes 128 for the identified instances of the file 108. In some instances, multiple instances of a file 108 may share a common file identifier 118 and timestamp 126 but may contain slightly different data content. After identifying candidates for being duplicate instances of a file 108, the database management device 104 confirms that the instances of the file 108 all contain the same data content. Here, the database management device 104 uses a hashing operation to determine whether the data contents of the instances of the file 108 are the same. For example, the database management device 104 may first identify data blocks that are associated with an instance of a file 108. The database management device 104 then performs a hashing operation (e.g. secure hash algorithm (SHA)-256) on each of the data blocks to generate a block hash code 128 for each data block. The resulting block hash code is a unique value that is based on the data content of a data block. This means that data blocks that have the same data content will have the same block hash code 128. Data blocks with different data content will have different block hash codes 128.

At operation 214, the database management device 104 determines whether there are any matching block hash codes 128 for the instances of the file 108. Here, the database management device 104 compares the block hash codes 128 for the instances of the file 108 to determine whether any duplicate instances of the file 108 were identified. For example, the database management device 104 may identify a first block hash code 128 and then compare the identified block hash code 128 to all of the block hash codes 128 that were generated in operation 212 to determine whether there are any matches.

The database management device 104 proceeds to operation 216 in response to determining that there are matching block hash codes 128 for the instances of the file 108. In this case, the database management device 104 has identified duplicate instances of the file 108 and proceeds to operation 216 to record these duplicate instances of the file 108. In some embodiments, the database management device 104 may also consider timestamps 126 or other file attributes when identifying duplicate instances of a file 108. For example, the database management device 104 may also compare timestamps 126 for instances of the file 108 that have matching block hash codes 128. In this example, the database management device 104 may identify a first timestamp 126 for a first duplicate instance of the file 108 and a second timestamp 126 for a second duplicate instance of the file 108. The database management device 104 then proceeds to operation 216 in response to determining that both the block hash codes 128 and the timestamps 126 are the same for the duplicate instances of the file 108. In other examples, the database management device 104 may use any other suitable type or combination of file attributes for identifying duplicate instances of a file 108.

At operation 216, the database management device 104 generates entries 132 in the file list 116 for the duplicate instances of the file 108 with matching block hash codes 128. In one embodiment, the database management device 104 generates an entry 132 for a duplicate instance of the file 108 that comprises a file identifier 118 for the instance, block identifiers 120 for the data blocks of the instance, a file location 122 for where the instance is stored, a file size 124 for the size of the instance, a timestamp 126 for when the instance was created, block hash codes 128 for the data blocks of the instance, and a file hash code 130 for the instance. In other embodiments, the database management device 104 may generate an entry 132 that comprises any other suitable type of information or combination, thereof. As an example, the database management device 104 may identify two duplicate instances of the file 108 that have the same block hash codes 128. In this example, the database management device 104 generates a first entry 132 in the file list 116 for a first duplicate instance of the file 108 and a second entry 132 in the file list 116 for a second duplicate instance of the file 108. The database management device 104 may repeat this process for any other duplicate instances of the file 108.

Returning to operation 214, the database management device 104 proceeds to operation 218 in response to determining that there are no matching block hash codes 128 for the instances of the file 108. In this case, the database management device 104 determines that there are no duplicate instances of the file 108. At operation 218, the database management device 104 determines whether to identify instances of another file 108. In one embodiment, the database management device 104 may be configured to identify instances for each file 108 that was identified in operation 206. In this case, the database management device 104 will determine to identify instances of another file 108 when one or more of the identified files 108 have not been analyzed for duplicate instances of the file 108. The database management device 104 returns to operation 208 in response to determining to identify instances of another file 108. In this case, the database management device 104 returns to operation 208 to begin searching for duplicate instances of another file 108.

Otherwise, the database management device 104 proceeds to operation 220 in response to determining not to identify instances of another file 108. In this case, the database management device 104 proceeds to operation 220 to determine whether to remove any of the duplicate instances of the file 108. In order to ensure that a file 108 is readily available to multiple users, the information system 100 is configured to store a preapproved number of duplicate instances of the file 108. This means that multiple copies of a file 108 are available so that more than one user can access the file 108. Over time, the number of duplicate instances of a file 108 may begin to grow as users begin to generate additional copies of the file 108. In this case, the additional copies of the file 108 begin to occupy additional memory resources of the information system 100 which reduces the amount of memory resources that are available for other documents and tasks. This problem increases when an excessive number of copies exist for multiple files 108. The database management device 104 proceeds to operation 220 to determine whether there is an excessive number of duplicate instances of the file 108 stored in the system 100.

At operation 220, the database management device 104 determines a number of entries 132 for a file 108 in the file list 116. Here, the database management device 104 counts the number of entries 132 that exist in the file list 116 for a file 108. For example, the database management device 104 may count the number of entries 132 that have the same file identifier 118, file hash code 130, block identifiers 120, or any other suitable type of information that is associated with a file 108.

At operation 222, the database management device 104 determines whether the number of entries 132 for the file 108 in the file list 116 is greater than a redundancy threshold value. The redundancy threshold value is a user-defined value that identifies an approved number of duplicate instances for a file 108 that can be stored in the information system 100. The redundancy threshold value may be set to a value of two, three, five, ten, or any other suitable number of duplicate instances for a file 108. The database management device 104 compares the determined number of entries 132 for the file 108 to the redundancy threshold value to determine whether number of entries 132 for the file 108 exceeds the redundancy threshold value.

The database management device 104 proceeds to operation 224 in response to determining that the number of entries 132 for the file 108 in the file list 116 is greater than a redundancy threshold value. In this case, the database management device 104 determines that there are too many duplicate instances of the file 108 stored in the information system 100. The database management device 104 proceeds to operation 224 to remove any excessive duplicate instances of the file 108.

At operation 224, the database management device 104 removes one or more instances of the file 108. Here, the database management device 104 removes one or more duplicate instances of the file 108 by deleting the duplicate instances of the file 108 from memory. The database management device 104 first identifies the number of duplicate instances of the file 108 that exceeds the redundancy threshold value. In other words, the database management device 104 determines a difference between the redundancy threshold value and the number of duplicate instances of the file 108 in the file list 116. For example, when the redundancy threshold value is set to a value of three and the database management device 104 determines that there are ten duplicate instances of the file 108 in the file list 116, the database management device 104 will determine to remove seven duplicate instances of the file 108 from memory. After determining the number of duplicate instances to delete from memory, the database management device 104 then deletes the identified number of duplicate instances of the file 108 from memory.

In one embodiment, the database management device 104 deletes the duplicate instances of the file 108 by sending instructions to a network device 102 where one or more of the duplicate instances of the file 108 are stored. For example, the database management device 104 may first identify a network device 102 based on the file location 122 for a duplicate instance of a file 108. The database management device 104 may then send instructions to the network device 102 that comprises a file identifier 118, a file location 122, or any other suitable type of information that identifies the duplicate instance of the file 108 to remove. The instructions may comprise commands or instructions (e.g. machine-executable instructions) that trigger the network device 102 to delete the identified instances of the file 108 from its memory. In this example, the database management device 104 may send any suitable type of messages or instructions to the network device 102. In response to receiving the instructions from the database management device 104, the network device 102 will delete the identified instances of the file 108 from its memory.

In another embodiment, the database management device 104 deletes the duplicate instances of the file 108 by sending instructions to a user (e.g. a system administrator or network operator). In this case, the database management device 104 sends instructions to the user that comprises a file identifier 118, a file location 122, or any other suitable type of information that identifies the duplicate instance of the file 108 to remove. The database management device 104 may send any suitable type of messages or instructions to the user. For example, the database management device 104 may send the instructions as an email, an application notification, or using any other suitable technique. In response to receiving the instructions from the database management device 104, the user will delete the identified instances of the file 108 from the memory of one or more network devices 102.

In another embodiment, the database management device 104 deletes the duplicate instances of the file 108 by accessing the file 108 in a network device 102 and deleting the file 108 from the memory of the network device 102. For example, the database management device 104 may determine where a duplicate instance of a file 108 is located based on the file location 122 for the instance of the file 108. The database management device 104 may then use the network connection that was established in operation 202 to access the location where the duplicate instance of a file 108 is stored in a network device 102 and to delete the duplicate instance of the file 108. In other embodiments, the database management device 104 may delete the duplicate instances of the file 108 using any other suitable technique.

Returning to operation 222, the database management device 104 proceeds to operation 226 in response to determining that the number of entries 132 for the file 108 in the file list 116 is less than or equal to the redundancy threshold value. In this case, the database management device 104 determines that an acceptable number of duplicate instances of the file 108 are stored in the information system 100 and there is no need to remove any duplicate instances of the file 108. In some embodiments, the database management device 104 may be configured to generate additional copies of a file 108 when the number of instances of the file 108 is less than the redundancy threshold value. This process allows the database management device 104 to ensure a suitable number of copies of the file 108 are available in the information system 100.

At operation 226, the database management device 104 determines whether to select another file 108 to analyze. Here, the database management device 104 determines whether to remove duplicate instances for any other files 108 in the file list 116. In one embodiment, the database management device 104 may be configured to analyze each file 108 in the file list 116. In this case, the database management device 104 will determine to analyze another file 108 when one or more of the files 108 in the file list 116 have not been analyzed for removing duplicate instances of the file 108.

The database management device 104 returns to operation 220 in response to determining to select another file 108 to analyze. In this case, the database management device 104 returns to operation 220 to analyze another file 108 to determine whether the number of duplicate instances of the file 108 is less than or equal to the approved number of duplicate instances for a file 108 that can be stored in the information system 100. Otherwise, the database management device 104 terminates process 200 in response to determining not to select another file 108 to analyze.

After deleting one or more duplicate instances of a file 108, the database management device 104 may generate a record of the activities and operations performed by the database management device 104. For example, the database management device 104 may generate activity history 114 that identifies the duplicate instances of the file 108 that were deleted from the information system 100. In some embodiments, the database management device 104 may also determine and record statistics about the operation of the information system 100 before and/or after deleting the duplicate instances of the file 108. For example, the database management device 104 may generate activity history 114 that comprises processor utilization, network utilization, memory utilization, or any other performance metrics for the network devices 102 of the information system 100.

Hardware Configuration for the Database Management Device

Figure 3:
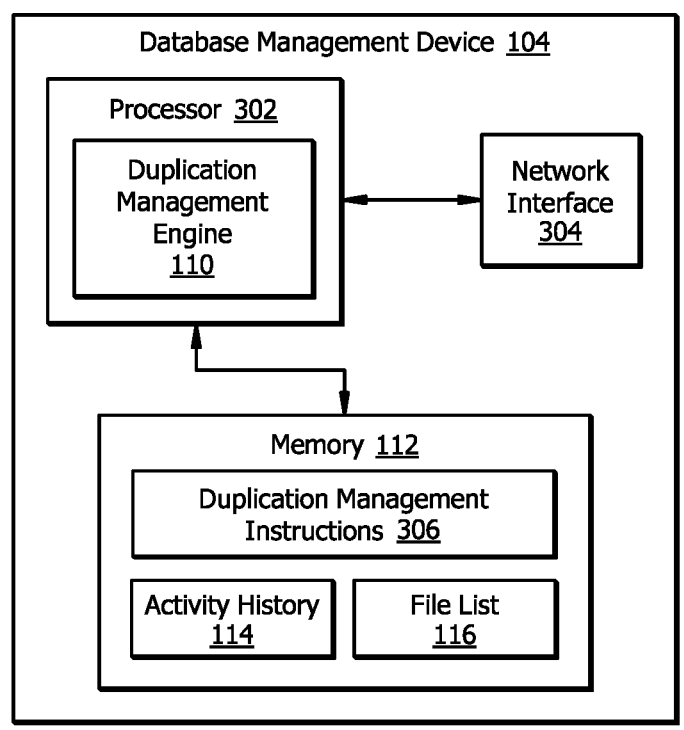
FIG. 3 is an embodiment of a database management device for the information system.

FIG. 3 is an embodiment of a database management device 104 for the information system 100. As an example, the database management device 104 may be a server or a computer. The database management device 104 comprises a processor 302, a memory 112, and a network interface 304. The database management device 104 may be configured as shown or in any other suitable configuration.

Processor

The processor 302 is a hardware device that comprises one or more processors operably coupled to the memory 112. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 112 and the network interface 304. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute duplication management instructions 306 to implement the duplication management engine 110. In this way, processor 302 may be a special-purpose computer designed to implement the functions disclosed herein. In an embodiment, the duplication management engine 110 is implemented using logic units, FPGAs, ASICs, DSPs, or any other suitable hardware. The duplication management engine 110 is configured to operate as described in FIGS. 1 and 2. For example, the duplication management engine 110 may be configured to perform the operations of process 200 as described in FIG. 2.

Memory

The memory 112 is a hardware device that is operable to store any of the information described above with respect to FIGS. 1 and 2 along with any other data, instructions, logic, rules, or code operable to implement the function(s) described herein when executed by the processor 302. The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store duplication management instructions 306, activity history 114, file lists 116, and/or any other data or instructions. The duplication management instructions 306 may comprise any suitable set of instructions, logic, rules, or code operable to execute the duplication management engine 110. The activity history 114 and file lists 116 are configured similar to the activity history 114 and file lists 116 described in FIGS. 1 and 2, respectively.

Network Interface

The network interface 304 is a hardware device that is configured to enable wired and/or wireless communications. The network interface 304 is configured to communicate data between network devices 102 and other devices, systems, or domains. For example, the network interface 304 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An information system, comprising:
one or more network devices, wherein each network device is configured to store a plurality of files; and
a database management device in signal communication with the one or more network devices, comprising a processor configured to:
access the plurality of files in the one or more network devices;
identify a set of files among the plurality of files, wherein each file in the set of files has a file size greater than a file size threshold value;
identify a first instance of a first file from among the set of files;
identify a first plurality of data blocks associated with the first instance of the first file;
generate a first set of block hash codes for the first plurality of data blocks;
identify a second instance of the first file from among the set of files;
identify a second plurality of data associated with the second instance of the first file;
generate a second set of block hash codes for the second plurality of data blocks;
compare the first set of block hash codes to the second set of block hash codes;
determine the first set of block hash codes matches the second set of block hash codes based on the comparison;
generate a first entry in a file list for the first instance for the first file in response to determining that the first set of block hash codes matches the second set of block hash codes, wherein the first entry identifies a first file identifier for the first file and a first location where the first instance for the first file is stored;
generate a second entry in the file list for the second instance for the first file in response to determining that the first set of block hash codes matches the second set of block hash codes, wherein the second entry identifies a second file identifier for the first file and a second location where the second instance for the first file is stored;
count a number of entries in the file list associated with the first file;
compare the number of entries in the file list associated with the first file to a redundancy threshold value, wherein the redundancy threshold value is an approved number of duplicate instances for the first file;

determine the number of entries in the file list associated with the first file is greater than the redundancy threshold value; and delete a number of instances associated with the first file in response to determining that the number of entries in the file list associated with the first file is greater than the redundancy threshold value, wherein the number of instances is equal to a difference between the number of entries in the file list associated with the first file and the redundancy threshold value.

2. The system of claim 1, wherein the database management device is further configured to:

identify a first timestamp for the first instance of the first file;

identify a second timestamp for the second instance of the first file;

determine the first timestamp is the same as the second timestamp; and wherein generating the first entry and the second entry in the file list for the first instance for the first file is in response to determining that the first timestamp is the same as the second timestamp.

3. The system of claim 1, wherein accessing the plurality of files in the one or more network devices comprises:

identifying a plurality of folders within the one or more network devices; and identifying the plurality of files from within the plurality of folders.

4. The system of claim 1, wherein deleting the number of instances associated with the first file comprises:

sending instructions to delete the number of instances associated with the first file to a first network device from among the one or more network devices, wherein the instructions identify file identifiers for one or more instances of the first file and one or more locations where the one or more instances for the first file are stored.

5. The system of claim 1, wherein deleting the number of instances associated with the first file comprises:

sending instructions to delete the number of instances associated with the first file to a device associated with a user, wherein the instructions identify file identifiers for one or more instances of the first file and one or more locations where the one or more instances for the first file are stored.

6. The system of claim 1, wherein deleting the number of instances associated with the first file comprises:

accessing a folder in a network device from among the one or more network devices, wherein the folder stores one or more instances for the first file; and deleting the one or more instances for the first file from the folder.

7. The system of claim 1, wherein the database management device is further configured to:

merge the first plurality of data blocks associated with the first instance of the file to generate the first file;

generate a file hash code for the first instance of the first file; and store the file hash code for the first instance of the first file in the first entry in the file list.

8. A file removing method, comprising:

accessing a plurality of files in one or more network devices;

identifying a set of files among the plurality of files, wherein each file in the set of files has a file size greater than a file size threshold value;

identifying a first instance of a first file from among the set of files;

identifying a first plurality of data blocks associated with the first instance of the first file;

generating a first set of block hash codes for the first plurality of data blocks;

identifying a second instance of the first file from among the set of files;

identifying a second plurality of data associated with the second instance of the first file;

generating a second set of block hash codes for the second plurality of data blocks;

comparing the first set of block hash codes to the second set of block hash codes;

determining the first set of block hash codes matches the second set of block hash codes based on the comparison;

generating a first entry in a file list for the first instance for the first file in response to determining that the first set of block hash codes matches the second set of block hash codes, wherein the first entry identifies a first file identifier for the first file and a first location where the first instance for the first file is stored;

generating a second entry in the file list for the second instance for the first file in response to determining that the first set of block hash codes matches the second set of block hash codes, wherein the second entry identifies a second file identifier for the first file and a second location where the second instance for the first file is stored;

counting a number of entries in the file list associated with the first file;

comparing the number of entries in the file list associated with the first file to a redundancy threshold value, wherein the redundancy threshold value is an approved number of duplicate instances for the first file;

determining the number of entries in the file list associated with the first file is greater than the redundancy threshold value; and deleting a number of instances associated with the first file in response to determining that the number of entries in the file list associated with the first file is greater than the redundancy threshold value, wherein the number of instances is equal to a difference between the number of entries in the file list associated with the first file and the redundancy threshold value.

9. The method of claim 8, further comprising:

identifying a first timestamp for the first instance of the first file;

identifying a second timestamp for the second instance of the first file;

determining the first timestamp is the same as the second timestamp; and wherein generating the first entry and the second entry in the file list for the first instance for the first file is in response to determining that the first timestamp is the same as the second timestamp.

10. The method of claim 8, wherein accessing the plurality of files in the one or more network devices comprises:

identifying a plurality of folders within the one or more network devices; and identifying the plurality of files from within the plurality of folders.

11. The method of claim 8, wherein deleting the number of instances associated with the first file comprises:
sending instructions to delete the number of instances associated with the first file to a first network device from among the one or more network devices, wherein the instructions identify file identifiers for one or more instances of the first file and one or more locations where the one or more instances for the first file are stored.

12. The method of claim 8, wherein deleting the number of instances associated with the first file comprises:
sending instructions to delete the number of instances associated with the first file to a device associated with a user, wherein the instructions identify file identifiers for one or more instances of the first file and one or more locations where the one or more instances for the first file are stored.

13. The method of claim 8, wherein deleting the number of instances associated with the first file comprises:
accessing a folder in a network device from among the one or more network devices, wherein the folder stores one or more instances for the first file; and
deleting the one or more instances for the first file from the folder.

14. The method of claim 8, further comprising:
merging the first plurality of data blocks associated with the first instance of the file to generate the first file;
generating a file hash code for the first instance of the first file; and
storing the file hash code for the first instance of the first file in the first entry in the file list.

15. A database management device comprising:
a network interface configured to communicate with one or more network devices, wherein each network device is configured to store a plurality of files; and
a processor operably coupled to the network interface, configured to:
access the plurality of files in the one or more network devices;
identify a set of files among the plurality of files, wherein each file in the set of files has a file size greater than a file size threshold value;
identify a first instance of a first file from among the set of files;
identify a first plurality of data blocks associated with the first instance of the first file;
generate a first set of block hash codes for the first plurality of data blocks;
identify a second instance of the first file from among the set of files;
identify a second plurality of data associated with the second instance of the first file;
generate a second set of block hash codes for the second plurality of data blocks;
compare the first set of block hash codes to the second set of block hash codes;
determine the first set of block hash codes matches the second set of block hash codes based on the comparison;
generate a first entry in a file list for the first instance for the first file in response to determining that the first set of block hash codes matches the second set of block hash codes, wherein the first entry identifies a first file identifier for the first file and a first location where the first instance for the first file is stored;
generate a second entry in the file list for the second instance for the first file in response to determining that the first set of block hash codes matches the second set of block hash codes, wherein the second entry identifies a second file identifier for the first file and a second location where the second instance for the first file is stored;
count a number of entries in the file list associated with the first file;
compare the number of entries in the file list associated with the first file to a redundancy threshold value, wherein the redundancy threshold value is an approved number of duplicate instances for the first file;
determine the number of entries in the file list associated with the first file is greater than the redundancy threshold value; and
delete a number of instances associated with the first file in response to determining that the number of entries in the file list associated with the first file is greater than the redundancy threshold value, wherein the number of instances is equal to a difference between the number of entries in the file list associated with the first file and the redundancy threshold value.

16. The device of claim 15, wherein the processor is further configured to:
identify a first timestamp for the first instance of the first file;
identify a second timestamp for the second instance of the first file;
determine the first timestamp is the same as the second timestamp; and
wherein generating the first entry and the second entry in the file list for the first instance for the first file is in response to determining that the first timestamp is the same as the second timestamp.

17. The device of claim 15, wherein accessing the plurality of files in the one or more network devices comprises:
identifying a plurality of folders within the one or more network devices; and
identifying the plurality of files from within the plurality of folders.

18. The device of claim 15, wherein deleting the number of instances associated with the first file comprises:
sending instructions to delete the number of instances associated with the first file to a first network device from among the one or more network devices, wherein the instructions identify file identifiers for one or more instances of the first file and one or more locations where the one or more instances for the first file are stored.

19. The device of claim 15, wherein deleting the number of instances associated with the first file comprises:
sending instructions to delete the number of instances associated with the first file to a device associated with a user, wherein the instructions identify file identifiers for one or more instances of the first file and one or more locations where the one or more instances for the first file are stored.

20. The device of claim 15, wherein deleting the number of instances associated with the first file comprises:
accessing a folder in a network device from among the one or more network devices, wherein the folder stores one or more instances for the first file; and
deleting the one or more instances for the first file from the folder.

* * * * *